United States Patent
Zhu et al.

(10) Patent No.: US 10,789,908 B2
(45) Date of Patent: Sep. 29, 2020

(54) REFRESH RATE ADJUSTMENT METHOD AND CIRCUIT, DISPLAY DEVICE, STORAGE MEDIUM

(71) Applicants: BEIJING BOE DISPLAY TECHNOLOGY CO., LTD., Beijing (CN); BOE TECHNOLOGY GROUP CO., LTD., Beijing (CN)

(72) Inventors: Hao Zhu, Beijing (CN); Xin Duan, Beijing (CN); Xibin Shao, Beijing (CN); Ming Chen, Beijing (CN); Jieqiong Wang, Beijing (CN); Yifang Chu, Beijing (CN); Chengqi Zhou, Beijing (CN)

(73) Assignees: BEIJING BOE DISPLAY TECHNOLOGY CO., LTD., Beijing (CN); BOE TECHNOLOGY GROUP CO., LTD., Beijing (CN)

( * ) Notice: Subject to any disclaimer, the term of this patent is extended or adjusted under 35 U.S.C. 154(b) by 17 days.

(21) Appl. No.: 16/321,879

(22) PCT Filed: Jun. 4, 2018

(86) PCT No.: PCT/CN2018/089737
§ 371 (c)(1),
(2) Date: Jan. 30, 2019

(87) PCT Pub. No.: WO2018/223911
PCT Pub. Date: Dec. 13, 2018

(65) Prior Publication Data
US 2019/0180713 A1    Jun. 13, 2019

(30) Foreign Application Priority Data
Jun. 9, 2017  (CN) .......................... 2017 1 0432843

(51) Int. Cl.
*G09G 5/00* (2006.01)
*G06F 3/14* (2006.01)

(52) U.S. Cl.
CPC ............... *G09G 5/006* (2013.01); *G06F 3/14* (2013.01); *G09G 5/005* (2013.01);
(Continued)

(58) Field of Classification Search
None
See application file for complete search history.

(56) References Cited

U.S. PATENT DOCUMENTS 9,508,111 B1 * 11/2016 Ogrinc ................. G09G 5/14
2012/0068993 A1 * 3/2012 Kambhatla ............ G09G 5/18
345/213

(Continued)

*Primary Examiner* — Nicholas J Lee
(74) *Attorney, Agent, or Firm* — Calfee, Halter & Griswold LLP

(57) ABSTRACT

A refresh rate adjustment method and circuit, a display device, and a storage medium, which pertains to the field of display technologies. The method includes acquiring a current driving refresh rate of a driving apparatus; determining whether the driving refresh rate is less than a driving refresh rate threshold; in response to the driving refresh rate being less than the driving refresh rate threshold, adjusting a display refresh rate of a display device, so that an adjusted display refresh rate is P times the driving refresh rate, and the adjusted display refresh rate is greater than the driving refresh rate threshold, where P is an integer greater than one.

20 Claims, 7 Drawing Sheets

(52) U.S. Cl.
CPC ..... *G09G 2310/04* (2013.01); *G09G 2310/08* (2013.01); *G09G 2320/0252* (2013.01); *G09G 2320/08* (2013.01); *G09G 2340/0435* (2013.01)

(56) References Cited

U.S. PATENT DOCUMENTS

| | | | |
|---|---|---|---|
| 2013/0100173 A1* | 4/2013 | Chaji | G09G 5/10 345/690 |
| 2015/0379970 A1* | 12/2015 | Albrecht | G09G 3/2003 345/214 |
| 2016/0125785 A1* | 5/2016 | Wang | G09G 5/001 345/582 |
| 2019/0371264 A1* | 12/2019 | Koo | G09G 5/006 |

* cited by examiner

REFRESH RATE ADJUSTMENT METHOD AND CIRCUIT, DISPLAY DEVICE, STORAGE MEDIUM

RELATED APPLICATION

The present application is the U.S. national phase entry of PCT/CN2018/089737, with an international filing date of Jun. 4, 2018, which claims the benefit of Chinese Patent Application No. 201710432843.2, filed on Jun. 9, 2017, the entire disclosure of which is incorporated herein by reference.

FIELD

The present disclosure relates to the field of display technologies, and particularly to a refresh rate adjustment method, a corresponding circuit, a display device, and a storage medium.

BACKGROUND

A display device generally needs to realize image display under the driving of a driving apparatus (such as a graphics card), wherein the display device typically includes a display panel and a driving circuit for driving the display panel.

In the related art, the driving apparatus may transmit an image frame to the display device at a certain driving refresh rate according to its processing capability and the display device's resolution, and then the display device outputs the image frame at a certain display refresh rate to realize image display. The driving refresh rate is usually time-varying, and the display refresh rate is usually constant.

In carrying out the present disclosure, the inventors have found that the related art has at least the following problems.

Since the driving refresh rate is time-varying and the display refresh rate is constant, the display refresh rate and the driving refresh rate cannot match each other, so that a frozen display phenomenon occurs in the display device, and the display effect is poor.

SUMMARY

The present disclosure provides a refresh rate adjustment method and circuit, a display device, and a storage medium. The technical solution is as follows.

In a first exemplary embodiment, there is provided a refresh rate adjustment method. The method comprises:

acquiring a current driving refresh rate of a driving apparatus;

determining whether the driving refresh rate is less than a driving refresh rate threshold;

in response to the driving refresh rate being less than the driving refresh rate threshold, adjusting a display refresh rate of a display device, so that an adjusted display refresh rate is P times the driving refresh rate, and the adjusted display refresh rate is greater than the driving refresh rate threshold, where P is an integer greater than one.

In an embodiment, after determining whether the driving refresh rate is less than a driving refresh rate threshold, the method further comprises: in response to the driving refresh rate being not less than the driving refresh rate threshold, adjusting the display refresh rate of the display device, so that the adjusted display refresh rate is equal to the driving refresh rate.

In an embodiment, said in response to the driving refresh rate being less than the driving refresh rate threshold, adjusting a display refresh rate of a display device, so that an adjusted display refresh rate is P times the driving refresh rate, and the adjusted display refresh rate is greater than the driving refresh rate threshold comprises: in response to the driving refresh rate being less than the driving refresh rate threshold, determining a transmission duration of a first image frame that is transmitted by the driving apparatus and is currently received; and outputting P first image frames using an output duration equal to the transmission duration.

In an embodiment, the first image frame comprises valid data, and said outputting P first image frames using an output duration equal to the transmission duration comprises: determining a valid output duration for outputting valid data of the P first image frames using a first transmission rate; determining an invalid output duration to which each of the first image frames corresponds according to the transmission duration and the valid output duration; filling invalid data at the end of the valid data of each of the first image frames according to the invalid output duration to which each of the first image frames corresponds and a second transmission rate, to obtain P processed first image frames; and outputting the P processed first image frames, wherein the valid data is outputted using the first transmission rate, and the invalid data is outputted using the second transmission rate.

In an embodiment, invalid output durations to which any two of the P first image frames correspond are equal; or invalid output durations to which at least two of the P first image frames correspond are not equal.

In an embodiment, invalid output durations to which any two of the P first image frames correspond are equal, and said determining an invalid output duration to which each of the first image frames corresponds according to the transmission duration and the valid output duration comprises: determining an invalid output duration to which each of the first image frames corresponds using a first invalid duration formula, where the first invalid duration formula is: $T_{blank1} = [\Delta t - (P/V_f)]/P$; wherein $T_{blank1}$ represents the invalid output duration to which each of the first image frames corresponds, $\Delta t$ represents the transmission duration, $P/V_f$ represents the valid output duration, and $V_f$ represents the first transmission rate.

In an embodiment, said in response to the driving refresh rate being not less than the driving refresh rate threshold, adjusting the display refresh rate of the display device, so that the adjusted display refresh rate is equal to the driving refresh rate comprises: in response to the driving refresh rate being not less than the driving refresh rate threshold, determining a transmission duration of a first image frame that is transmitted by the driving apparatus and is currently received; and outputting the first image frame using an output duration equal to the transmission duration.

In an embodiment, the first image frame comprises valid data, and said outputting the first image frame using an output duration equal to the transmission duration comprises: determining a valid output duration for outputting valid data of the first image frame using a first transmission rate; determining an invalid output duration to which the first image frame corresponds according to the transmission duration and the valid output duration; filling invalid data at the end of the valid data of the first image frame according to the invalid output duration to which the first image frame corresponds and a second transmission rate, to obtain a processed first image frame; and outputting the processed first image frame, wherein the valid data is outputted using the first transmission rate, and the invalid data is outputted using the second transmission rate.

In an embodiment, said determining an invalid output duration to which the first image frame corresponds according to the transmission duration and the valid output duration comprises: determining an invalid output duration to which the first image frame corresponds using a second invalid duration formula, where the second invalid duration formula is: $T_{blank2}=\Delta t-(1/V_f)$; wherein $T_{blank2}$ represents the invalid output duration to which the first image frame corresponds, $\Delta t$ represents the transmission duration, $1/V_f$ represents the valid output duration, and $V_f$ represents the first transmission rate.

In an embodiment, a unit of the first transmission rate is the same as that of a refresh rate of the display device, and a value of the first transmission rate is not less than that of a maximum refresh rate of the display device.

In a second exemplary embodiment, there is provided a refresh rate adjustment circuit. The circuit comprises: an acquisition circuit for acquiring a current driving refresh rate of a driving apparatus; a determination circuit for determining whether the driving refresh rate is less than a driving refresh rate threshold; and a first adjustment circuit for adjusting a display refresh rate of a display device in response to the driving refresh rate being less than the driving refresh rate threshold, so that an adjusted display refresh rate is P times the driving refresh rate, and the adjusted display refresh rate is greater than the driving refresh rate threshold, where P is an integer greater than one.

In an embodiment, the circuit further comprises a second adjustment circuit for adjusting the display refresh rate of the display device in response to the driving refresh rate being not less than the driving refresh rate threshold, so that the adjusted display refresh rate is equal to the driving refresh rate.

In an embodiment, the first adjustment circuit comprises a first determination sub-circuit for determining, in response to the driving refresh rate being less than the driving refresh rate threshold, a transmission duration of a first image frame that is transmitted by the driving apparatus and is currently received; and a first output sub-circuit for outputting P first image frames using an output duration equal to the transmission duration.

In an embodiment, the first image frame comprises valid data, and the first output sub-circuit comprises: a first determiner for determining a valid output duration for outputting valid data of the P first image frames using a first transmission rate; a second determiner for determining an invalid output duration to which each of the first image frames corresponds according to the transmission duration and the valid output duration; a first filler for filling invalid data at the end of valid data of each of the first image frames according to the invalid output duration to which each of the first image frames corresponds and a second transmission rate, to obtain P processed first image frames; and a first outputter for outputting the P processed first image frames, wherein the valid data is outputted using the first transmission rate, and the invalid data is outputted using the second transmission rate.

In an embodiment, invalid output durations to which any two of the P first image frames correspond are equal; or invalid output durations to which at least two of the P first image frames correspond are not equal.

In an embodiment, invalid output durations to which any two of the P first image frames correspond are equal, and the second determiner is used for determining the invalid output duration to which each of the first image frames corresponds using a first invalid duration formula, where the first invalid duration formula is: $T_{blank1}=[\Delta t-(P/V_f)]/P$; wherein $T_{blank1}$ represents the invalid output duration to which each of the first image frames corresponds, $\Delta t$ represents the transmission duration, $P/V_f$ represents the valid output duration, and $V_f$ represents the first transmission rate.

In an embodiment, the second adjustment circuit comprises: a second determination sub-circuit for determining, in response to the driving refresh rate being not less than the driving refresh rate threshold, a transmission duration of a first image frame that is transmitted by the driving apparatus and is currently received; and a second output sub-circuit for outputting the first image frame using an output duration equal to the transmission duration.

In an embodiment, the first image frame includes valid data, and the second output sub-circuit comprises: a third determiner for determining a valid output duration for outputting the valid data of the first image frame using a first transmission rate; a fourth determiner for determining an invalid output duration to which the first image frame corresponds according to the transmission duration and the valid output duration; a second filler for filling invalid data at the end of the valid data of the first image frame according to the invalid output duration to which the first image frame corresponds and a second transmission rate, to obtain a processed first image frame; and a second outputter for outputting the processed first image frame, wherein the valid data is outputted using the first transmission rate, and the invalid data is outputted using the second transmission rate.

In an embodiment, the fourth determiner is used for determining an invalid output duration to which the first image frame corresponds using a second invalid duration formula, where the second invalid duration formula is: $T_{blank2}=\Delta t-(1/V_f)$; wherein $T_{blank2}$ represents the invalid output duration to which the first image frame corresponds, $\Delta t$ represents the transmission duration, $1/V_f$ represents the valid output duration, and $V_f$ represents the first transmission rate.

In an embodiment, a unit of the first transmission rate is the same as that of a refresh rate of the display device, and a value of the first transmission rate is not less than that of a maximum refresh rate of the display device.

In a third exemplary embodiment, there is provided a display device, the display device comprising the refresh rate adjustment circuit described in the second exemplary embodiment or any optional manner of the second exemplary embodiment.

In a fourth exemplary embodiment, there is provided a computer readable storage medium, which is stored with instructions for causing a computer to execute the refresh rate adjustment method provided by the first exemplary embodiment or any optional manner of the first exemplary embodiment in response to the computer readable storage medium being run on the computer.

It is to be understood that the above general description and the following detailed description are merely exemplary and are not intended to limit the present disclosure.

BRIEF DESCRIPTION OF THE DRAWINGS

In order to illustrate technical solutions in various embodiments of the present disclosure more clearly, the drawings that need to be used for description of the embodiments will be briefly described below. It is obvious that the drawings in the description below are merely some embodiments of the present disclosure. Other drawings may be further obtained by those ordinarily skilled in the art on the basis of these drawings without spending inventive efforts.

The accompanying drawings are incorporated into the specification and constitute part of the specification, which illustrate embodiments conforming to the present disclosure and serve to explain the principles of the present disclosure together with the specification.

DETAILED DESCRIPTION

To make the objective, technical solutions and advantages of the present disclosure clearer, the present disclosure will be further described in detail below with reference to the accompanying drawings. Obviously, the described embodiments are merely part of the embodiments of the present disclosure, rather than all of them. All other embodiments obtained by those ordinarily skilled in the art based on the embodiments of the present disclosure without spending inventive efforts fall within the scope of the present disclosure.

Figure 1:
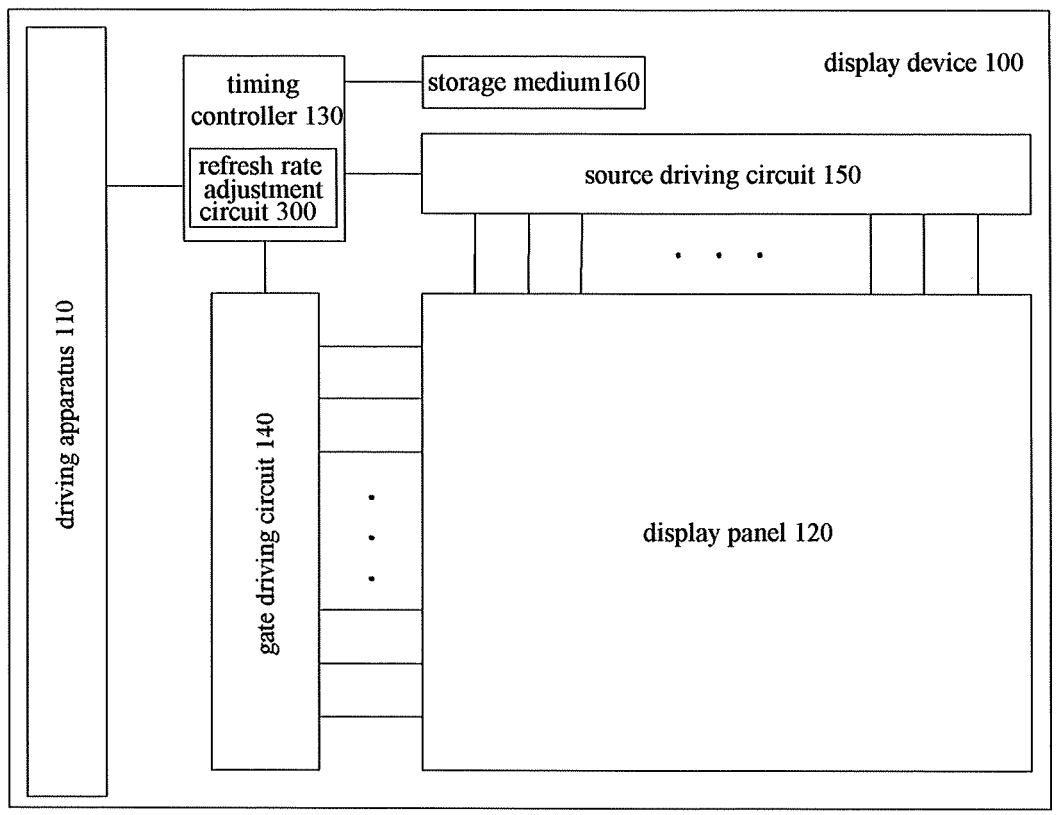
FIG. 1 is a schematic view showing an application environment involved in various embodiments of the present disclosure.

FIG. 1 is a schematic view showing an application environment involved in various embodiments of the present disclosure. Referring to FIG. 1, a display device 100 is shown. The display device 100 comprises a driving apparatus 110 and a display panel 120. The driving apparatus 110 may be a graphics card, and the display device 100 needs to realize image display through the display panel 120 under the driving of the driving apparatus 110. Alternatively or in an embodiment, the driving apparatus 110 may also be disposed outside and coupled to the display device 100 independently of the display device 100.

As shown in FIG. 1, the display device 100 further comprises a driving circuit (not shown in FIG. 1) for driving the display panel 120. The driving circuit includes a timing controller 130, a gate driving circuit 140, and a source driving circuit 150. The gate driving circuit 140 is used to perform progressive scanning on each row of pixel in the display panel 120. The source driving circuit 150 is used to provide data signals for each column of pixel in the display panel 120. The timing controller 130 is connected to the gate driving circuit 140, the source driving circuit 150 and the driving apparatus 110, respectively, and used to control signals outputted by the gate driving circuit 140 and the source driving circuit 150 according to the driving refresh rate of the driving apparatus 110, so as to adjust the refresh rate of the display device 100. The timing controller 130 may be further adapted with a refresh rate adjustment circuit 300 according to an embodiment of the present disclosure, and a detailed description about the refresh rate adjustment circuit 300 will be given below with reference to FIGS. 3a to 3f.

Alternatively or in one embodiment, the display device 100 may further comprise a computer readable storage medium 160. The computer readable storage medium 160 is stored with instructions which cause a computer to execute the method according to an embodiment of the present disclosure when the computer readable storage medium 160 is run on the computer.

Those ordinarily skilled in the art can understand that all or part of the steps for implementing embodiments of the present disclosure may be carried out by hardware, and may also be carried out by instructing related hardware by programs. The program may be stored in the computer readable storage medium 160. Alternatively or in an embodiment, the computer readable storage medium 160 may be coupled to the timing controller 130. The computer readable storage medium 160 may be a read only memory, a magnetic disk, an optical disk, and the like.

The display device 100 may be any product or component having a display function such as a liquid crystal panel, an electronic paper, an organic light emitting diode (OLED) panel, a mobile phone, a tablet computer, a television, a display, a notebook computer, a digital photo frame, a navigator, and the like.

Figure 2A:
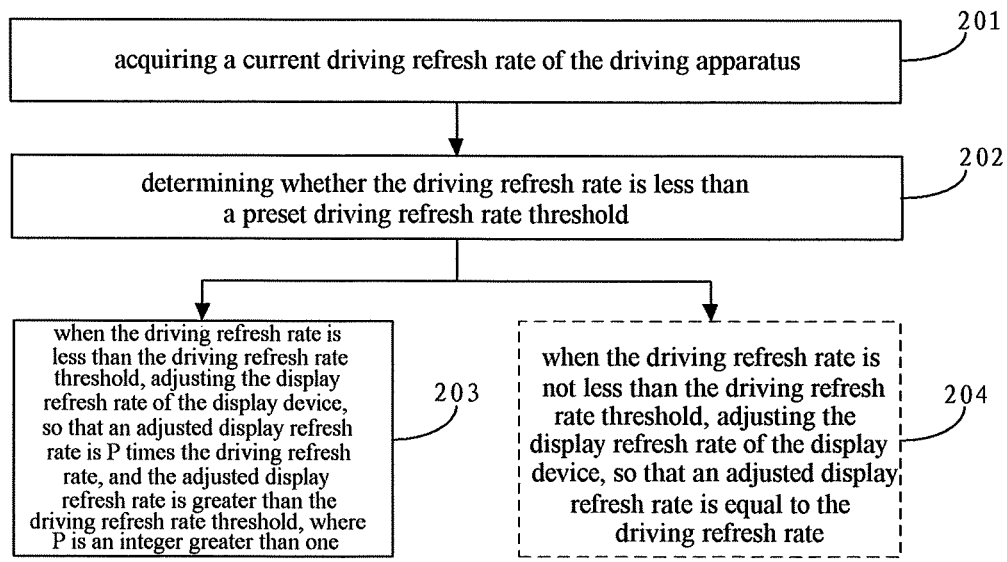
FIG. 2a is a flowchart of a refresh rate adjustment method provided by an embodiment of the present disclosure.

Referring to FIG. 2a, which illustrates a flowchart of a refresh rate adjustment method provided by an embodiment of the present disclosure, the refresh rate adjustment method may be executed by a refresh rate adjustment circuit 300. As described above, the refresh rate adjustment circuit 300 may be a functional circuit in a timing controller 022 shown in FIG. 1. Referring to FIG. 2a, the method comprises the following steps. At step 201, a current driving refresh rate of the driving apparatus is acquired.

The driving apparatus may be a display driving apparatus, and may specifically be a graphics card. The driving apparatus may input an image frame to the display device, and the frequency at which the driving apparatus inputs the image frame to the display device is the driving refresh rate.

In various embodiments of the present disclosure, the refresh rate adjustment circuit 300 may acquire the current driving refresh rate of the driving apparatus by means of the number of image frames received by the display device; or the driving apparatus may send the driving refresh rate in real time to the refresh rate adjustment circuit 300, and the refresh rate adjustment circuit 300 acquires the current driving refresh rate of the driving apparatus by receiving the driving refresh rate sent by the driving apparatus; or the refresh rate adjustment circuit 300 may send an acquisition request for acquiring the driving refresh rate to the driving apparatus, receive an acquisition response sent by the driving apparatus, and acquire the current driving refresh rate of the driving apparatus based on the content of the acquisition response. The manner in which the current driving refresh rate of the driving apparatus is acquired is not limited in various embodiments of the present disclosure. In an embodiment of the present disclosure, it is assumed that the current driving refresh rate of the driving apparatus is f1.

It is to be noted that, in various embodiments of the present disclosure, the refresh rate adjustment circuit 300 may acquire the current driving refresh rate of the driving apparatus in real time. When change rate of the driving refresh rate is small, the refresh rate adjustment circuit 300 may also acquire the driving refresh rate at predetermined time intervals, and use the acquired driving refresh rate as the current driving refresh rate of the driving apparatus. The predetermined time interval may be set empirically, which is not limited in various embodiments of the present disclosure. In addition, the schemes for acquiring the driving refresh rate as listed above are only exemplary. In actual applications, the driving refresh rate may be acquired using other schemes, and the specific acquisition process may refer to related technologies, and details are not described herein again.

At step 202, it is determined whether the driving refresh rate is less than a driving refresh rate threshold.

After the refresh rate adjustment circuit 300 acquires the current driving refresh rate of the driving apparatus, it may determine whether the driving refresh rate is less than a driving refresh rate threshold. The driving refresh rate threshold may be denoted as f, and the specific value of f may be set empirically, for example, f=30 fps (frames per second), which is not limited in various embodiments of the present disclosure.

In an embodiment, the refresh rate adjustment circuit 300 may compare the driving refresh rate f1 with the driving refresh rate threshold f to determine whether the driving refresh rate is less than the driving refresh rate threshold.

Figure 2B:
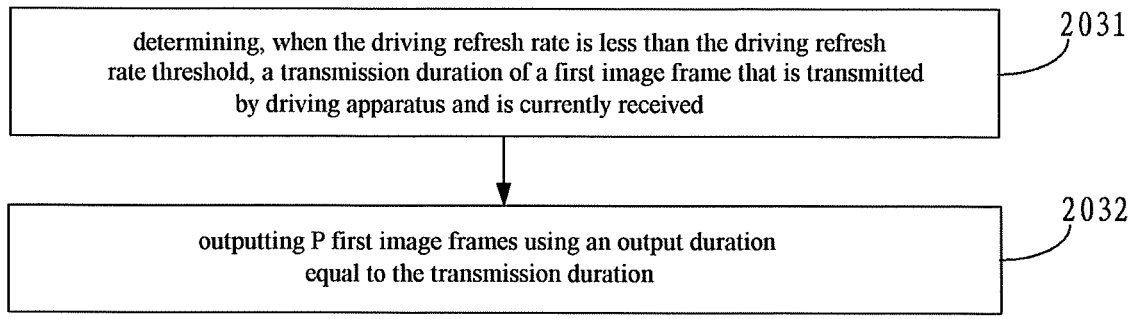
FIG. 2b is a flowchart of a specific step of a refresh rate adjustment method provided by an embodiment of the present disclosure.

At step 203, when the driving refresh rate f1 is less than the driving refresh rate threshold f, the display refresh rate of the display device is adjusted, so that an adjusted display refresh rate is P times the driving refresh rate, and the adjusted display refresh rate f1 is greater than the driving refresh rate threshold f, where P is an integer greater than one. In an example, referring to FIG. 2b, which illustrates a flowchart of a specific step of a refresh rate adjustment method provided by an embodiment of the present disclosure, the method comprises the following steps.

At sub-step 2031, when the driving refresh rate is less than the driving refresh rate threshold, a transmission duration of a first image frame that is transmitted by driving apparatus and is currently received is determined.

The transmission time for the first image frame that is transmitted by the driving apparatus and is currently received may be before the current time and closest to the current time. In an embodiment, a timer and a recognizer may be disposed in the display device. The first image frame has a start identifier and an end identifier, and the display device can recognize the start identifier and the end identifier of the first image frame by means of the recognizer during the process of transmitting the first image frame by the driving apparatus to the display device. When the display device recognizes the start identifier of the first image frame, the display device turns on the timer to start timing. When the display device recognizes the end identifier of the first image frame, the display device turns off the timer to stop timing, and the refresh rate adjustment circuit 300 may determine a time difference between the time at which the display device stops timing and the time at which it starts timing as the transmission duration of the first image frame. It is to be noted that the scheme for determining the transmission duration of the first image frame as described herein is merely exemplary. In actual applications, other schemes may also be used to determine the transmission duration of the first image frame, and details are not described herein again.

It is to be noted that, in an embodiment of the present disclosure, the first image frame may include valid data and invalid data. The valid data is used for image display, and the invalid data is not used for image display. The invalid data may also be referred to as blanking data. After the first image frame transmitted by the driving apparatus is received by the display device, the valid data of the first image frame may be stored, which is not limited in various embodiments of the present disclosure.

Figure 2C:
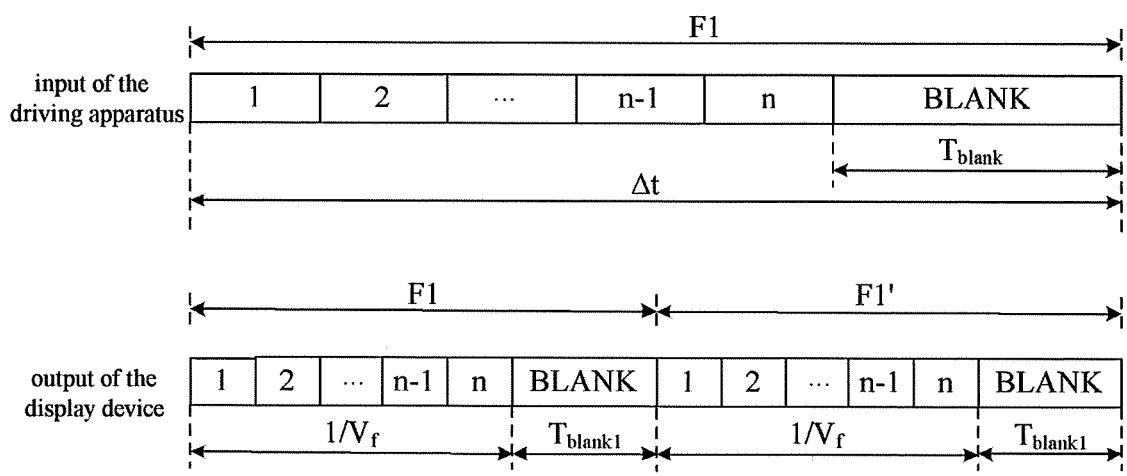
FIG. 2c is a schematic view of a refresh rate adjustment method provided by an embodiment of the present disclosure.

By way of example, referring to FIG. 2c, it illustrates a schematic view of a refresh rate adjustment method provided by an embodiment of the present disclosure. Referring to FIG. 2c, a first image frame F1 inputted by the driving apparatus (i.e. transmitted by the driving apparatus to the display device) includes valid data 1~n and invalid data BLANK, the valid data 1~n is used for image display, and the invalid data BLANK is not used for image display. The transmission duration of the first image frame F1 may be Δt. After receiving the first image frame F1, the display device may store the valid data 1~n.

At sub-step 2032, P first image frames are outputted using an output duration equal to the transmission duration.

Figure 2D:
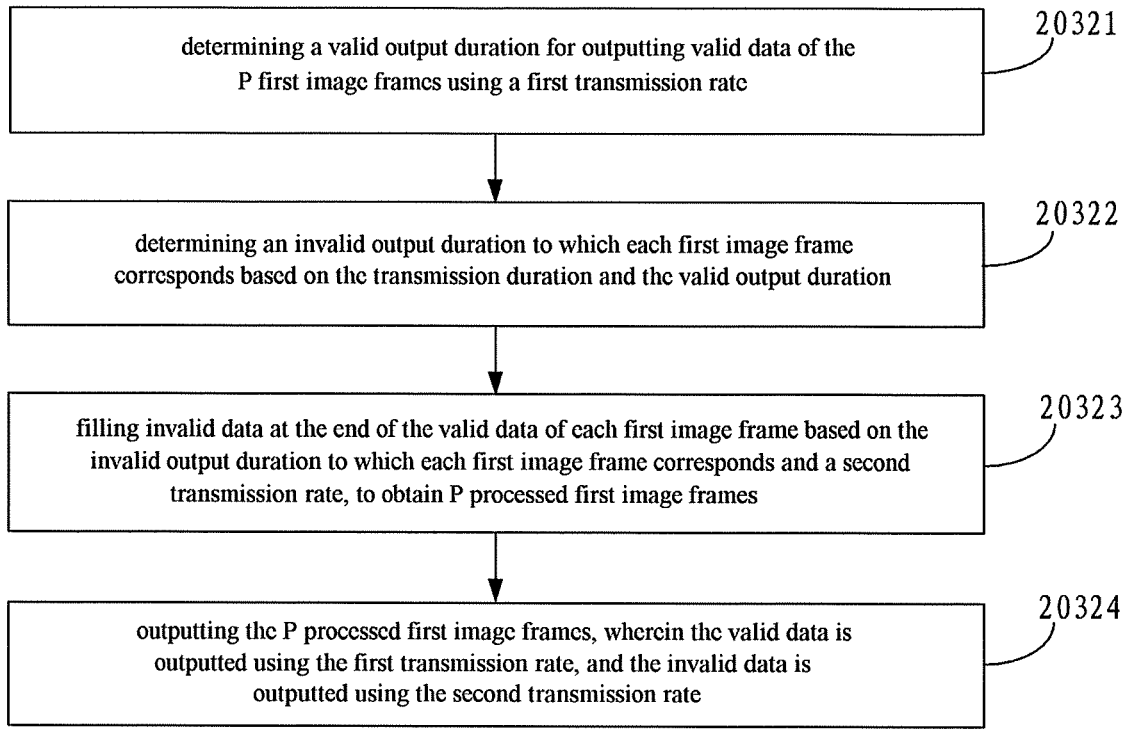
FIG. 2d is a flowchart of another specific step of a refresh rate adjustment method provided by an embodiment of the present disclosure.

After the refresh rate adjustment circuit 300 determines the transmission duration of the first image frame, P first image frames may be outputted using an output duration equal to the transmission duration, so that the display refresh rate of the display device can be adjusted to P times the driving refresh rate of the driving apparatus. In FIG. 2c, P is illustrated as 2. By way of example, referring to FIG. 2d, it illustrates a flowchart of a method for outputting P first image frames using an output duration equal to the transmission duration as provided by an embodiment of the present disclosure. The method comprises the following steps. At sub-step 20321, a valid output duration for outputting valid data of the P first image frames using a first transmission rate is determined.

The first image frame may include valid data and invalid data. The output duration of the valid data may be a valid output duration, and the output duration of the invalid data may be an invalid output duration. The first transmission rate may be a fixed transmission rate, which may be a point to point (P2P) interface rate of the display device. The unit of the first transmission rate may be the same as that of the refresh rate of the display device, and the value of the first transmission rate is not less than the value of the maximum refresh rate of the display device. In this way, it can be ensured that the data transmission rate can keep up with the refresh rate of the display device. In an embodiment, the unit of the first transmission rate may be fps. Generally, the refresh rate of the display device may range from 30 fps to 150 fps (or 30 Hz to 150 Hz). It can be known that the maximum refresh rate of the display device can be 150 fps. Thus, the first transmission rate may be greater than 150 fps, which is not limited in various embodiments of the present disclosure.

In an embodiment of the present disclosure, the first transmission rate is denoted as $V_f$, and the unit of the first transmission rate $V_f$ may be fps. It can be determined based on the unit of the first transmission rate $V_f$ that a valid output duration for outputting the valid data of one first image frame using the first transmission rate $V_f$ may be $1/V_f$, so that a valid output duration for outputting the valid data of P first image frames using the first transmission rate may be $P/V_f$. By way of example, continuing to refer to FIG. 2c, it illustrates P=2 as an example. The valid output duration for the display device to output the valid data 1~n of each first image frame F1 is $1/V_f$, thus the valid output duration for the display device to output the valid data 1~n of two first image frames F1 is $2/V_f$, that is, the valid output duration in FIG. 2c is $2/V_f$.

It is to be noted that, the scheme for determining the valid output duration for outputting the valid data of P first image frames using the first transmission rate as described above is merely exemplary. In actual applications, other schemes may also be used to determine the valid output duration for outputting the valid data of P first image frames, and details are not described herein again.

At sub-step 20322, an invalid output duration to which each first image frame corresponds is determined based on the transmission duration and the valid output duration.

After determining the transmission duration of the first image frame and the valid output duration for outputting the valid data of the P first image frames using the first transmission rate, the refresh rate adjustment circuit 300 may determine an invalid output duration to which each first image frame corresponds based on the transmission duration and the valid output duration. The invalid output duration to which each first image frame corresponds is namely a duration for outputting the invalid data of each first image frame, which is not limited in various embodiments of the present disclosure.

In an embodiment, the invalid output durations to which any two of the P first image frames correspond are equal. At that time, the refresh rate adjustment circuit 300 may determine the invalid output duration to which each first image frame corresponds using a first invalid duration formula. The first invalid duration formula may be $T_{blank1}=[\Delta t-(P/V_f)]/P$, where $T_{blank1}$ represents the invalid output duration of each first image frame, $\Delta t$ represents the transmission duration for the driving apparatus to transmit the first image frame to the display device, $P/V_f$ represents the valid output duration for outputting the valid data of the P first image frames using the first transmission rate $V_f$, and $V_f$ represents the first transmission rate. By way of example, as shown in FIG. 2c, the invalid output duration to which each first image frame F1 corresponds is $T_{blank1}$.

In an embodiment, the invalid output durations to which at least two of the P first image frames correspond are not equal. At that time, the refresh rate adjustment circuit 300 may randomly allocate an invalid output duration for each first image frame on the premise of ensuring that the sum of the invalid output durations to which the P first image frames correspond is equal to $[\Delta t-(P/V_f)]$, and determine the invalid output duration allocated for each first image frame as an invalid output duration to which each first image frame corresponds. It is to be noted that the scheme for determining the invalid output duration to which each first image frame corresponds as described herein is merely exemplary. In actual applications, in case the invalid output durations to which at least two of the P first image frames correspond are not equal, the refresh rate adjustment circuit 300 may also determine the invalid output duration to which each first image frame corresponds in other manners, and details are not described herein again.

At sub-step 20323, invalid data is filled at the end of the valid data of each first image frame based on the invalid output duration to which each first image frame corresponds and a second transmission rate, to obtain P processed first image frames.

After the refresh rate adjustment circuit 300 determines the invalid output duration to which each first image frame corresponds, invalid data may be filled at the end of the valid data of each first image frame based on the invalid output duration to which each first image frame corresponds and a second transmission rate, to obtain P processed first image frames. The second transmission rate is an output rate of the invalid data of the first image frame. The second transmission rate may be equal to the first transmission rate, or may be different from the first transmission rate, which is not limited in various embodiments of the present disclosure. Preferably, the second transmission rate is equal to the first transmission rate. By way of example, referring to FIG. 2c, the refresh rate adjustment circuit 300 fills invalid data BLANK at the end of the valid data n of each first image frame F1 based on the invalid output time period $T_{blank1}$ to which each first image frame F1 corresponds and the second transmission rate, to obtain two processed first image frames F1.

At sub-step 20324, the P processed first image frames are outputted, wherein the valid data is outputted using the first transmission rate, and the invalid data is outputted using the second transmission rate.

After the invalid data is filled at the end of the valid data of each first image frame, the refresh rate adjustment circuit 300 may output the P processed first image frames, so that the display device can display images according to the P processed first image frames. The refresh rate adjustment circuit 300 may output the valid data of each first image frame using the first transmission rate $V_f$, and output the invalid data of each first image frame using the second transmission rate. In an embodiment of the present disclosure, data is continuously outputted, and the refresh rate adjustment circuit 300 outputs data by frame. Therefore, in the process of outputting the P processed first image frames, the refresh rate adjustment circuit 300 may output valid data of a first one of the first image frames, then output invalid data of the first one of the first image frames, then output valid data of a second one of the first image frames, and then output invalid data of the second one of the first image frames, and so on.

By way of example, as shown in FIG. 2c, the refresh rate adjustment circuit 300 outputs the valid data 1~n of the first image frame F1 using the first transmission rate $V_f$, then outputs the invalid data BLANK of the first image frame F1 using the second transmission rate, then outputs the valid data 1~n of the first image frame F1' using the first transmission rate $V_f$, and finally outputs the invalid data BLANK of the first image frame F1' using the second transmission rate. In an embodiment of the present disclosure, when the driving refresh rate is less than the driving refresh rate threshold (30 fps), the display refresh rate is adjusted to be twice the driving refresh rate, which can guarantee a smooth display of images.

Alternatively or in an embodiment, in step 204, when the driving refresh rate is not less than the driving refresh rate threshold, the display refresh rate of the display device is adjusted such that the adjusted display refresh rate is equal to the driving refresh rate.

Figure 2E:
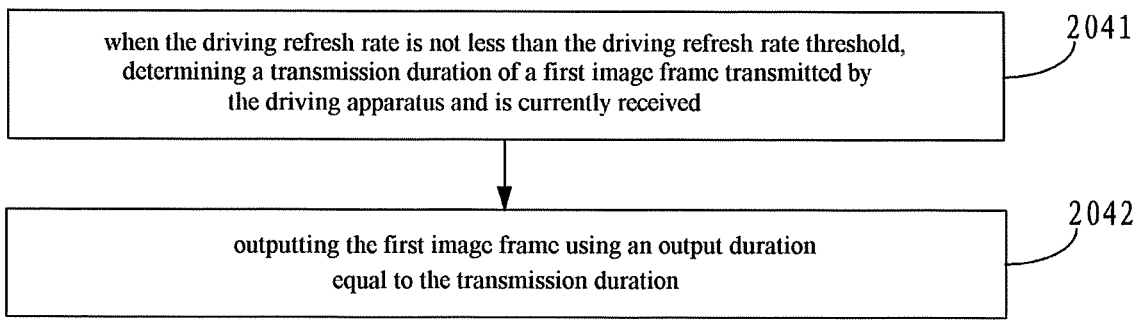
FIG. 2e is a flowchart of a further specific step of a refresh rate adjustment method provided by an embodiment of the present disclosure.

When the refresh rate adjustment circuit 300 determines in step 202 that the driving refresh rate is not less than the driving refresh rate threshold, the refresh rate adjustment circuit 300 adjusts the display refresh rate of the display device in step 204 such that the adjusted display refresh rate is equal to the driving refresh rate. Referring to FIG. 2e, it illustrates a flowchart of another method for adjusting the display refresh rate of the display device as provided by an embodiment of the present disclosure. Referring to FIG. 2e, the method comprises the following steps.

At sub-step 2041, when the driving refresh rate is not less than the driving refresh rate threshold, a transmission duration of a first image frame transmitted by the driving apparatus and is currently received is determined.

For the specific implementation process of the sub-step 2041, reference may be made to the sub-step 2031 described above, and details are not described herein again.

At sub-step 2042, the first image frame is outputted using an output duration equal to the transmission duration.

Figure 2F:
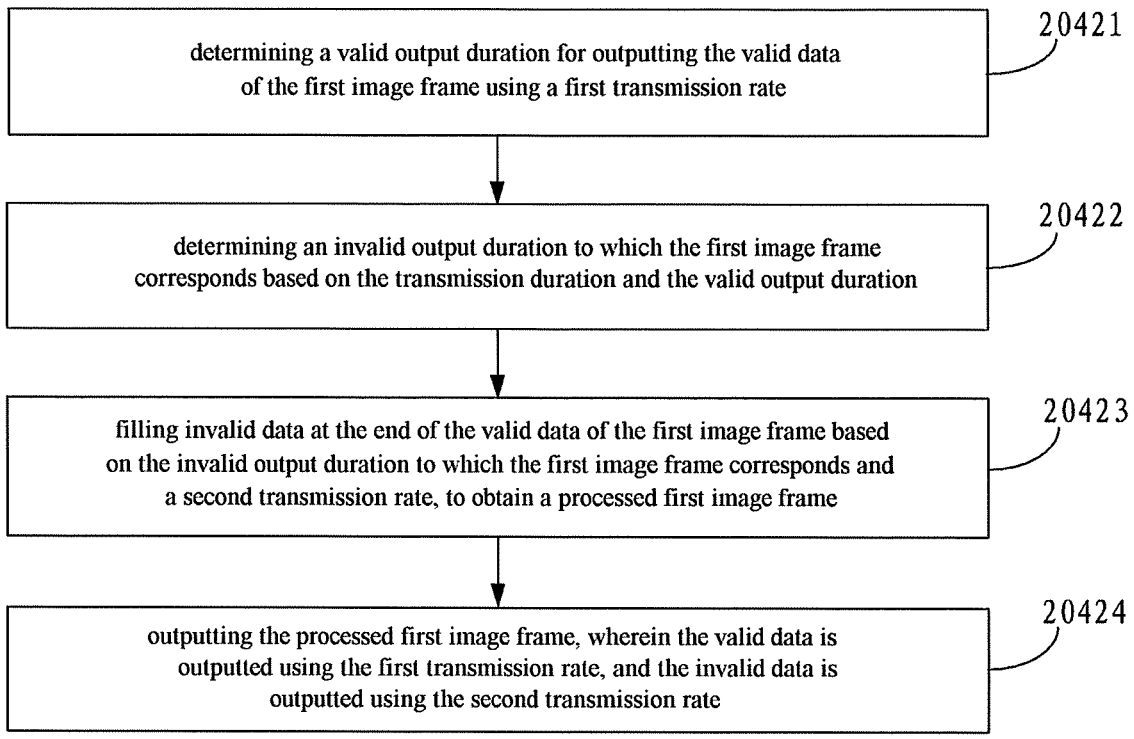
FIG. 2f is a flowchart of yet another specific step of a refresh rate adjustment method provided by an embodiment of the present disclosure.

After the refresh rate adjustment circuit 300 determines the transmission duration of the first image frame, the first image frame may be outputted using an output duration equal to the transmission duration, so that the display refresh rate of the display device can be equal to the driving refresh rate of the driving apparatus, thus the display refresh rate can vary with the driving refresh rate. Referring to FIG. 2f, which illustrates a flowchart of a method for outputting the first image frame as provided by an embodiment of the present disclosure, the method comprises the following steps.

At sub-step 20421, a valid output duration for outputting the valid data of the first image frame using a first transmission rate is determined.

The first image frame may include valid data and invalid data. The output duration of the valid data may be a valid output duration, and the output duration of the invalid data may be an invalid output duration. The first transmission rate may be a fixed transmission rate, which may be a P2P interface rate of the display device. The unit of the first transmission rate may be the same as that of the refresh rate of the display device, and the value of the first transmission rate is not less than that of a maximum refresh rate of the display device, which can ensure that the data transmission rate can keep up with the refresh rate of the display device. In an embodiment, the unit of the first transmission rate may be fps. Generally, the refresh rate of the display device may range from 30 fps to 150 fps (or 30 Hz to 150 Hz). It can be known that the maximum refresh rate of the display device may be 150 fps, thus the first transmission rate may be greater than 150 fps, which is not limited in various embodiments of the present disclosure.

Figure 2G:
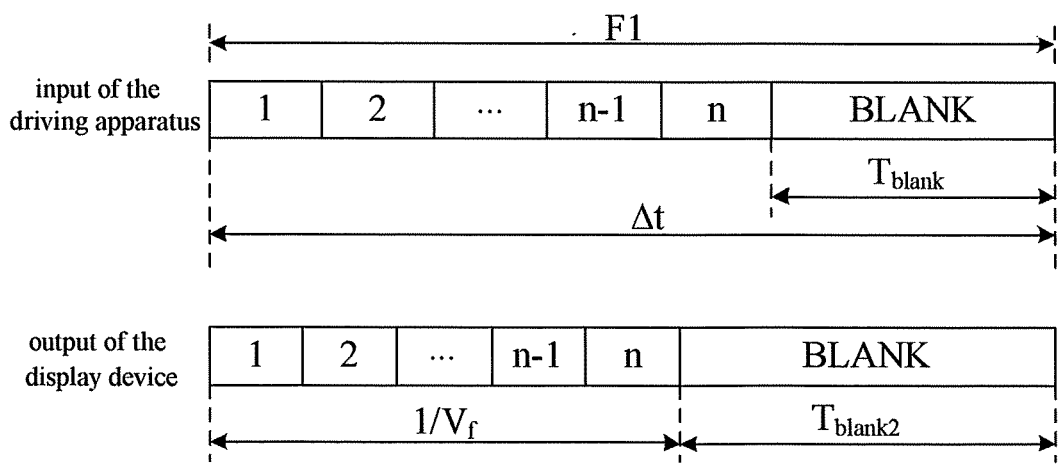
FIG. 2g is another schematic view of a refresh rate adjustment method provided by an embodiment of the present disclosure.

In an embodiment of the present disclosure, the first transmission rate may be $V_f$, and the unit of the first transmission rate $V_f$ may be fps. It may be determined based on the unit of the first transmission rate $V_f$ that the valid output duration for outputting the valid data of the first image frame using the first transmission rate $V_f$ may be 1/Vf. By way of example, referring to FIG. 2g, it illustrates another schematic view of a refresh rate adjustment method provided by an embodiment of the present disclosure. Referring to FIG. 2g, the first image frame F1 inputted by the driving apparatus includes valid data 1~n and invalid data BLANK. The transmission duration of the first image frame F1 may be Δt, and the valid output duration for the display device to output the valid data 1~n of the first image frame F1 is $1/V_f$.

At sub-step 20422, an invalid output duration to which the first image frame corresponds is determined based on the transmission duration and the valid output duration.

After determining the transmission duration of the first image frame and the valid output duration for outputting the valid data of the first image frame using the first transmission rate, the refresh rate adjustment circuit 300 may determine an invalid output duration to which the first image frame corresponds based on the transmission duration and the valid transmission duration. The invalid output duration to which the first image frame corresponds is namely the duration for outputting the invalid data of the first image frame, which is not limited in various embodiments of the present disclosure.

In an embodiment, the refresh rate adjustment circuit 300 may determine the invalid output duration to which the first image frame corresponds using a second invalid duration formula, where the second invalid duration formula may be: $T_{blank2}=\Delta t-(1/V_f)$, wherein $T_{blank2}$ represents the invalid output duration to which the first image frame corresponds, Δt represents the transmission duration for the driving apparatus to transmit the first image frame to the display device, $1/V_f$ represents the valid output duration for outputting the valid data of the first image frame using the first transmission rate $V_f$, and $V_f$ represents the first transmission rate. By way of example, as shown in FIG. 2g, the invalid output duration to which the first image frame F1 corresponds is $T_{blank2}$.

At sub-step 20423, invalid data is filled at the end of the valid data of the first image frame based on the invalid output duration to which the first image frame corresponds and a second transmission rate, to obtain a processed first image frame.

After the refresh rate adjustment circuit 300 determines the invalid output duration to which the first image frame corresponds, invalid data may be filled at the end of the valid data of the first image frame based on the invalid output duration to which the first image frame corresponds and a second transmission rate, to obtain a processed first image frame. The second transmission rate is an output rate of the invalid data of the first image frame, and the second transmission rate may be equal to the first transmission rate, or may be different from the first transmission rate, which is not limited in various embodiments of the present disclosure. Preferably, the second transmission rate is equal to the first transmission rate. By way of example, continuing to refer to FIG. 2g, the refresh rate adjustment circuit 300 fills the invalid data BLANK at the end of the valid data n of the first image frame F1 based on the invalid output duration to which the first image frame F1 corresponds and the second transmission rate, to obtain a processed first image frame F1.

At sub-step 20424, the processed first image frame is outputted, wherein the valid data is outputted using the first transmission rate, and the invalid data is outputted using the second transmission rate.

After the invalid data is filled at the end of the valid data of the first image frame, the refresh rate adjustment circuit 300 may output the processed first image frame so that the display device can display images according to the processed first image frame. The refresh rate adjustment circuit 300 may output the valid data of the first image frame using the first transmission rate $V_f$, and output the invalid data of the first image frame using the second transmission rate. In an embodiment of the present disclosure, data is outputted continuously. During the process of outputting the processed first image frame, the refresh rate adjustment circuit 300 may first output the valid data of the first image frame, and then output the invalid data of the first image frame. By way of example, as shown in FIG. 2g, the refresh rate adjustment circuit 300 outputs the valid data 1~n of the first image frame F1 using the first transmission rate $V_f$, and then outputs the invalid data BLANK of the first image frame F1 using the second transmission rate.

In the refresh rate adjustment method provided by various embodiments of the present disclosure, a P2P interface may be used to output the valid data at the first transmission rate, so that the invalid transmission duration (BLANK time) can be adjusted so as to further adjust the output duration of each image frame dynamically. The display refresh rate can be adjusted by adjusting the output duration of each image frame.

In summary, since the refresh rate adjustment method provided by various embodiments of the present disclosure can adjust the display refresh rate according to the driving refresh rate so that they match each other, it solves the problems regarding occurrence of a frozen display phenomenon in the display device and poor display effect, thereby improving the display effect of the display device.

In the refresh rate adjustment method provided by various embodiments of the present disclosure, when the driving refresh rate is less than the driving refresh rate threshold, the display refresh rate of the display device is adjusted so that the adjusted display refresh rate is P times the driving refresh rate, which can guarantee a smooth display of images. When the driving refresh rate is not less than the driving refresh rate threshold, the display refresh rate of the display device is adjusted to make the adjusted display refresh rate equal to the driving refresh rate, so that the display refresh rate of the display device can be adaptive to the driving refresh rate of the driving apparatus, thereby achieving a better display effect.

What are described below are device embodiments of the present disclosure, which can be used to carry out the method embodiments of the present disclosure. For details not disclosed in the device embodiments of the present disclosure, reference can be made to the method embodiments of the present disclosure.

Figure 3A:
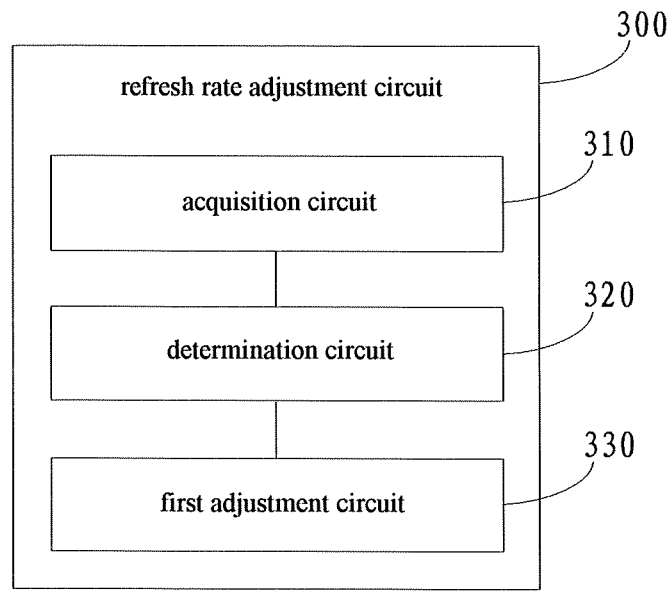
FIG. 3a is a block diagram of a refresh rate adjustment circuit provided by an embodiment of the present disclosure.

Referring to FIG. 3a, which illustrates a block diagram of a refresh rate adjustment circuit 300 provided by an embodiment of the present disclosure, the refresh rate adjustment circuit 300 may be a functional circuit in the timing controller 022 as shown in FIG. 1 for carrying out the refresh rate adjustment method provided by an embodiment as shown in FIG. 2a. Referring to FIG. 3a, the refresh rate adjustment circuit 300 may include, but is not limited to, an acquisition circuit 310 for acquiring a current driving refresh rate of the driving apparatus; a determination circuit 320 for determining whether the driving refresh rate is less than a driving refresh rate threshold; and a first adjustment circuit 330 for adjusting a display refresh rate of the display device when the driving refresh rate is less than the driving refresh rate threshold, so that an adjusted display refresh rate is P times the driving refresh rate, and the adjusted display refresh rate is greater than the driving refresh rate threshold, where P is an integer greater than 1.

In summary, since the refresh rate adjustment circuit 300 provided by an embodiment of the present disclosure can adjust the display refresh rate according to the driving refresh rate so that they match each other, it solves the problems regarding occurrence of a frozen display phenomenon in the display device and poor display effect, thereby improving the display effect of the display device.

Figure 3B:
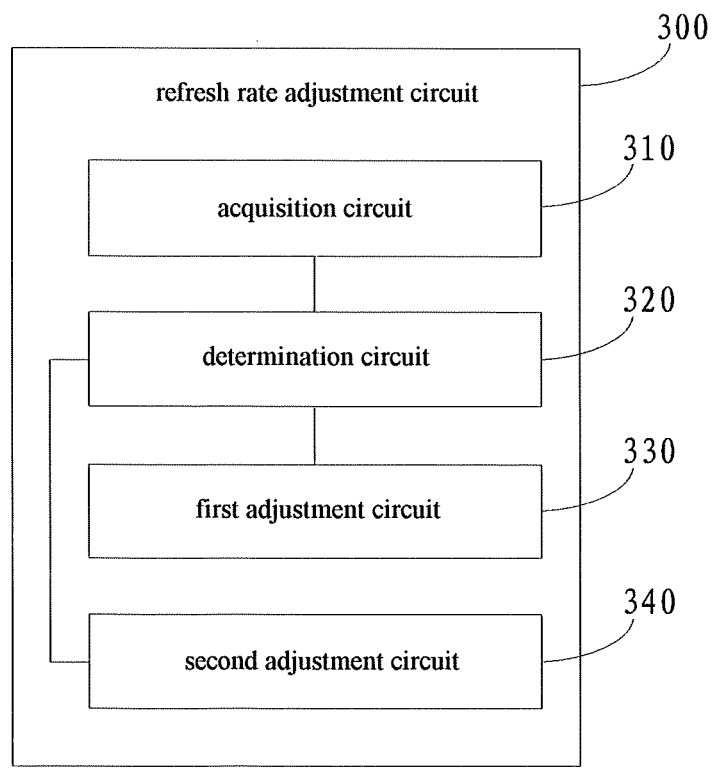
FIG. 3b is a block diagram of another refresh rate adjustment circuit provided by an embodiment of the present disclosure.

Further, referring to FIG. 3b, it illustrates a block diagram of another refresh rate adjustment circuit 300 provided by an embodiment of the present disclosure. Referring to FIG. 3b, on the basis of FIG. 3a, the refresh rate adjustment circuit 300 further includes a second adjustment circuit 340 for adjusting the display refresh rate of the display device when the driving refresh rate is not less than the driving refresh rate threshold, so that the adjusted display refresh rate is equal to the driving refresh rate.

Figure 3C:
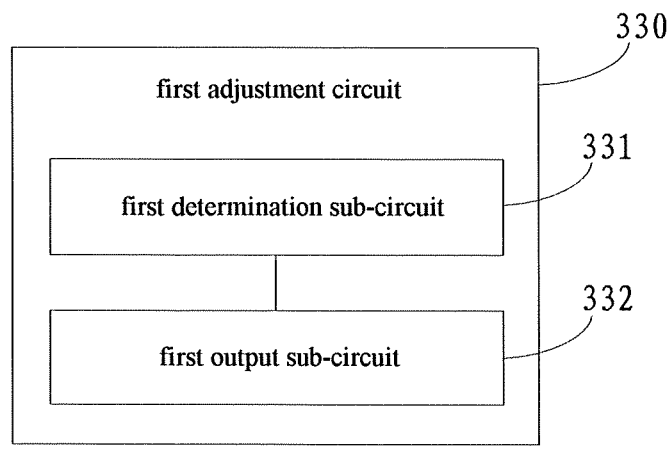
FIG. 3c is a block diagram of a first adjustment circuit provided by an embodiment of the present disclosure.

In an embodiment, referring to FIG. 3c, it illustrates a block diagram of a first adjustment circuit 330 provided by an embodiment of the present disclosure. Referring to FIG. 3c, the first adjustment circuit 330 includes: a first determination sub-circuit 331 for determining, when the driving refresh rate is less than the driving refresh rate threshold, a transmission duration of a first image frame that is transmitted by the driving apparatus and is currently received; and a first output sub-circuit 332 for outputting P first image frames using an output duration equal to the transmission duration.

Figure 3D:
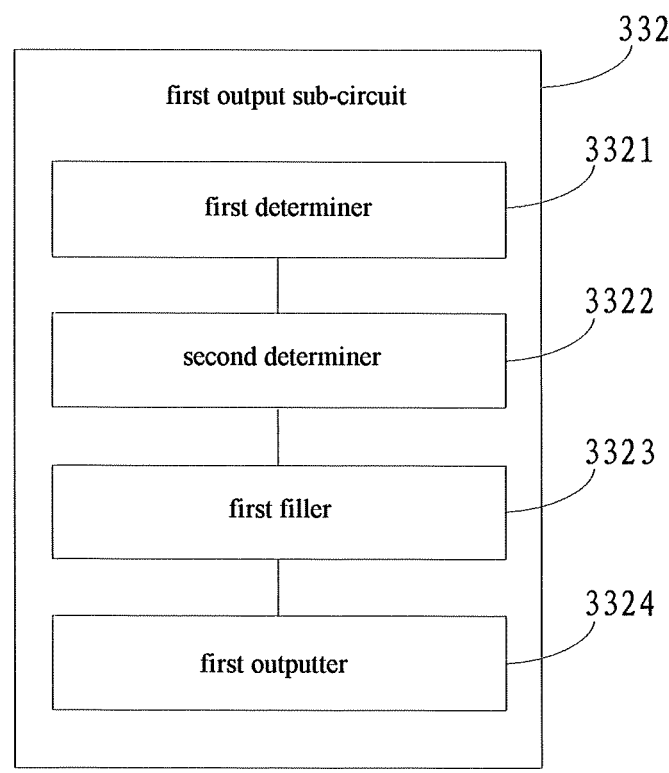
FIG. 3d is a block diagram of a first output sub-circuit provided by an embodiment of the present disclosure.

In an embodiment, the first image frame includes valid data. Referring to FIG. 3d, it illustrates a block diagram of a first output sub-circuit 332 provided by an embodiment of the present disclosure. Referring to FIG. 3d, the first output sub-circuit 332 includes: a first determiner 3321 for determining a valid output duration for outputting valid data of the P first image frames using a first transmission rate; a second determiner 3322 for determining an invalid output duration to which each first image frame corresponds based on the transmission duration and the valid output duration; a first filler 3323 for filling invalid data at the end of the valid data of each first image frame based on the invalid output duration to which each first image frame corresponds and a second transmission rate, to obtain P processed first image frames; and a first outputter 3324 for outputting the P processed first image frames, wherein the valid data is outputted using the first transmission rate, and the invalid data is outputted using the second transmission rate.

In an embodiment, invalid output durations to which any two of the P first image frames correspond are equal; or invalid output durations to which at least two of the P first image frames correspond are not equal.

In an embodiment, invalid output durations to which any two of the P first image frames correspond are equal, and the second determiner 3322 is used for determining the invalid output duration to which each first image frame corresponds by using a first invalid duration formula, where the first invalid duration formula is: $T_{blank1}=[\Delta t-(P/V_f)]/P$, wherein $T_{blank1}$ represents the invalid output duration to which each first image frame corresponds, $\Delta t$ represents the transmission duration, $P/V_f$ represents the valid output duration, and $V_f$ represents the first transmission rate.

Figure 3E:
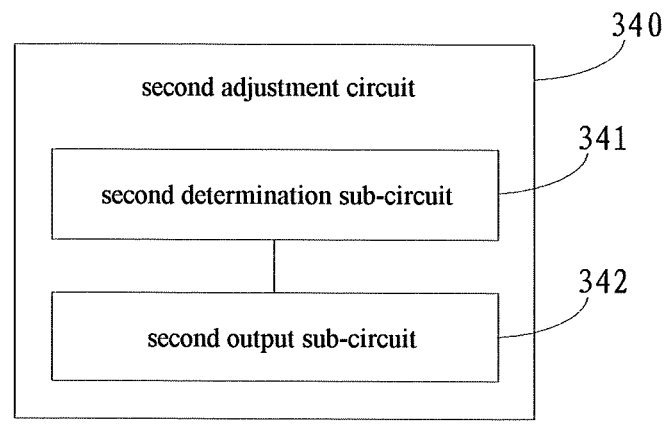
FIG. 3e is a block diagram of a second adjustment circuit provided by an embodiment of the present disclosure.

In an embodiment, referring to FIG. 3e, it illustrates a block diagram of a second adjustment circuit 340 provided by an embodiment of the present disclosure. Referring to FIG. 3e, the second adjustment circuit 340 includes a second determination sub-circuit 341 for determining, when the driving refresh rate is not less than the driving refresh rate threshold, a transmission duration of a first image frame that is transmitted by the driving apparatus and is currently received; and a second output sub-circuit 342 for outputting the first image frame using an output duration equal to the transmission duration.

Figure 3F:
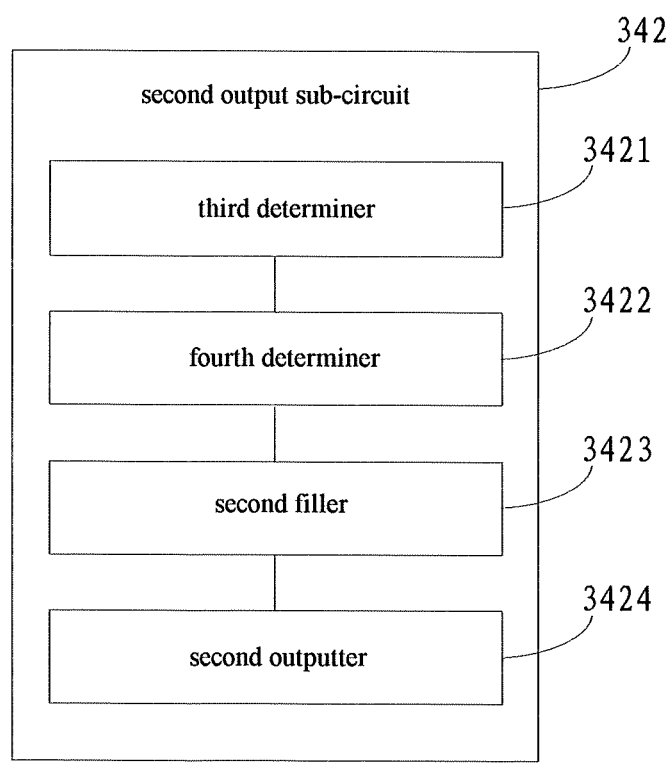
FIG. 3f is a block diagram of a second output sub-circuit provided by an embodiment of the present disclosure.

In an embodiment, the first image frame includes valid data. Referring to FIG. 3f, it illustrates a block diagram of a second output sub-circuit 342 provided by an embodiment of the present disclosure. Referring to FIG. 3f, the second output sub-circuit 342 includes: a third determiner 3421 for determining a valid output duration for outputting valid data of the first image frame using the first transmission rate; and a fourth determiner 3422 for determining an invalid output duration which the first image frame corresponds based on the transmission duration and the valid output duration; a second filler 3423 for filling invalid data at the end of the valid data of the first image frame based on the invalid output duration to which the first image frame corresponds and a second transmission rate, to obtain a processed first image frame; and a second outputter 3424 for outputting the processed first image frame, wherein the valid data is outputted using the first transmission rate and the invalid data is outputted using the second transmission rate.

In an embodiment, the fourth determiner 3422 is used for determining an invalid output duration to which the first image frame corresponds using a second invalid duration formula, where the second invalid duration formula is: $T_{blank2}=\Delta t-(1/V_f)$, wherein $T_{blank2}$ represents the invalid output duration to which the first image frame corresponds, $\Delta t$ represents the transmission duration, $1/V_f$ indicates the valid output duration, and $V_f$ indicates the first transmission rate.

In an embodiment, the unit of the first transmission rate is the same as that of the refresh rate of the display device, and the value of the first transmission rate is not less than that of the maximum refresh rate of the display device.

In summary, since the refresh rate adjustment circuit provided by various embodiments of the present disclosure can adjust the display refresh rate according to the driving refresh rate so that they match each other, it solves the problems regarding occurrence of a frozen display phenomenon in the display device and poor display effect, thereby improving the display effect of the display device.

It is to be noted that the refresh rate adjustment circuit provided by the embodiments described above is only illustrated based on division of the above functional circuits when it adjusts the display refresh rate of the display device. In actual applications, the above functions may be allocated to different functional circuits as needed, that is, the internal structure of a device is divided into different functional circuits, so as to carry out all or part of the functions described above. In addition, the refresh rate adjustment circuit provided by the embodiments described above pertains to the same concept as the refresh rate adjustment method. For its specific implementation process, reference may be made to the method embodiments, and details are not described herein again.

What have been described above are merely exemplary embodiments of the present disclosure, and are not intended to limit the present disclosure. Any modifications, equivalent substitutions, improvements, and the like made within the spirit and principle of the present disclosure should be included in the protection scope thereof.

The invention claimed is:

1. A refresh rate adjustment method, wherein the method comprises:
    acquiring a current driving refresh rate of a driving apparatus;
    determining whether the current driving refresh rate is less than a driving refresh rate threshold; and
    in response to the current driving refresh rate being less than the driving refresh rate threshold, adjusting a display refresh rate of a display device, so that an adjusted display refresh rate is P times the driving refresh rate, and the adjusted display refresh rate is greater than the driving refresh rate threshold, where P is an integer greater than one.

2. The method according to claim 1, wherein after determining whether the current driving refresh rate is less than the driving refresh rate threshold, the method further comprises:
    in response to the current driving refresh rate being not less than the driving refresh rate threshold, adjusting the display refresh rate of the display device, so that the adjusted display refresh rate is equal to the current driving refresh rate.

3. The method according to claim 1, wherein said in response to the current driving refresh rate being less than the driving refresh rate threshold, adjusting a display refresh rate of a display device, so that an adjusted display refresh rate is P times the current driving refresh rate, and the adjusted display refresh rate is greater than the driving refresh rate threshold comprises:
    in response to the current driving refresh rate being less than the driving refresh rate threshold, determining a transmission duration of a first image frame that is transmitted by the driving apparatus and is currently received; and
    outputting P first image frames using an output duration equal to the transmission duration.

4. The method according to claim 3, wherein the first image frame comprises valid data, and said outputting P first image frames using an output duration equal to the transmission duration comprises:
    determining a valid output duration for outputting the valid data of the P first image frames using a first transmission rate;
    determining an invalid output duration to which each of the first image frames corresponds according to the transmission duration and the valid output duration;
    filling invalid data at an end of the valid data of each of the first image frames according to the invalid output duration to which each of the first image frames corresponds and a second transmission rate, to obtain P processed first image frames; and
    outputting the P processed first image frames, wherein the valid data is outputted using the first transmission rate, and the invalid data is outputted using the second transmission rate.

5. The method according to claim 4, wherein invalid output durations to which any two of the P first image frames correspond are equal; or invalid output durations to which at least two of the P first image frames correspond are not equal.

6. The method according to claim 4, wherein invalid output durations to which any two of the P first image frames correspond are equal, and said determining an invalid output duration to which each of the first image frames corresponds according to the transmission duration and the valid output duration comprises:
    determining an invalid output duration to which each of the first image frames corresponds using a first invalid duration formula, where the first invalid duration formula is: $T_{blank1}=[\Delta t-(P/V_f)]/P$;
    wherein $T_{blank}$ represents the invalid output duration to which each of the first image frames corresponds, $\Delta t$ represents the transmission duration, $P/V_f$ represents the valid output duration, and $V_f$ represents the first transmission rate.

7. The method according to claim 2, wherein said in response to the driving current refresh rate being not less than the driving refresh rate threshold, adjusting the display refresh rate of the display device, so that the adjusted display refresh rate is equal to the current driving refresh rate comprises:
    in response to the current driving refresh rate being not less than the driving refresh rate threshold, determining a transmission duration of a first image frame that is transmitted by the driving apparatus and is currently received; and outputting the first image frame using an output duration equal to the transmission duration.

8. The method according to claim 7, wherein the first image frame comprises valid data, and said outputting the first image frame using an output duration equal to the transmission duration comprises:
   determining a valid output duration for outputting the valid data of the first image frame using a first transmission rate;
   determining an invalid output duration to which the first image frame corresponds according to the transmission duration and the valid output duration;
   filling invalid data at an end of the valid data of the first image frame according to the invalid output duration to which the first image frame corresponds and a second transmission rate, to obtain a processed first image frame; and
   outputting the processed first image frame, wherein the valid data is outputted using the first transmission rate, and the invalid data is outputted using the second transmission rate.

9. The method according to claim 8, wherein said determining an invalid output duration to which the first image frame corresponds according to the transmission duration and the valid output duration comprises:
   determining an invalid output duration to which the first image frame corresponds using a second invalid duration formula, where the second invalid duration formula is:
   $T_{blank2}=\Delta t-(1/V_f)$;
   wherein $T_{blank2}$ represents the invalid output duration to which the first image frame corresponds, $\Delta t$ represents the transmission duration, $1/V_f$ represents the valid output duration, and $V_f$ represents the first transmission rate.

10. A refresh rate adjustment circuit, wherein the circuit comprises:
    an acquisition circuit for acquiring a current driving refresh rate of a driving apparatus;
    a determination circuit for determining whether the current driving refresh rate is less than a driving refresh rate threshold; and
    a first adjustment circuit for adjusting a display refresh rate of a display device in response to the current driving refresh rate being less than the driving refresh rate threshold, so that an adjusted display refresh rate is P times the current driving refresh rate, and the adjusted display refresh rate is greater than the driving refresh rate threshold, where P is an integer greater than one.

11. The circuit according to claim 10, wherein the circuit further comprises:
    a second adjustment circuit for adjusting the display refresh rate of the display device in response to the current driving refresh rate being not less than the driving refresh rate threshold, so that the adjusted display refresh rate is equal to the current driving refresh rate.

12. The circuit according to claim 10, wherein the first adjustment circuit comprises:
    a first determination sub-circuit for determining, in response to the current driving refresh rate being less than the driving refresh rate threshold, a transmission duration of a first image frame that is transmitted by the driving apparatus and is currently received; and
    a first output sub-circuit for outputting P first image frames using an output duration equal to the transmission duration.

13. The circuit according to claim 12, wherein the first image frame comprises valid data, and the first output sub-circuit comprises:
    a first determiner for determining a valid output duration for outputting the valid data of the P first image frames using a first transmission rate;
    a second determiner for determining an invalid output duration to which each of the first image frames corresponds according to the transmission duration and the valid output duration;
    a first filler for filling invalid data at an end of valid data of each of the first image frames according to the invalid output duration to which each of the first image frames corresponds and a second transmission rate, to obtain P processed first image frames; and
    a first outputter for outputting the P processed first image frames, wherein the valid data is outputted using the first transmission rate, and the invalid data is outputted using the second transmission rate.

14. The circuit according to claim 13, wherein invalid output durations to which any two of the P first image frames correspond are equal; or invalid output durations to which at least two of the P first image frames correspond are not equal.

15. The circuit according to claim 13, wherein invalid output durations to which any two of the P first image frames correspond are equal, and the second determiner is configured for:
    determining the invalid output duration to which each of the first image frames corresponds using a first invalid duration formula, where the first invalid duration formula is: $T_{blank1}=[\Delta t-(P/V_f)]/P$;
    wherein $T_{blank1}$ represents the invalid output duration to which each of the first image frames corresponds, $\Delta t$ represents the transmission duration, $P/V_f$ represents the valid output duration, and $V_f$ represents the first transmission rate.

16. The circuit according to claim 11, wherein the second adjustment circuit comprises:
    a second determination sub-circuit for determining, in response to the current driving refresh rate being not less than the driving refresh rate threshold, a transmission duration of a first image frame that is transmitted by the driving apparatus and is currently received; and
    a second output sub-circuit for outputting the first image frame using an output duration equal to the transmission duration.

17. The circuit according to claim 16, wherein the first image frame includes valid data, and the second output sub-circuit comprises:
    a third determiner for determining a valid output duration for outputting the valid data of the first image frame using a first transmission rate;
    a fourth determiner for determining an invalid output duration to which the first image frame corresponds according to the transmission duration and the valid output duration;
    a second filler for filling invalid data at an end of the valid data of the first image frame according to the invalid output duration to which the first image frame corresponds and a second transmission rate, to obtain a processed first image frame; and
    a second outputter for outputting the processed first image frame, wherein the valid data is outputted using the first transmission rate, and the invalid data is outputted using the second transmission rate.

18. The circuit according to claim 17, wherein the fourth determiner is configured for:

determining an invalid output duration to which the first image frame corresponds using a second invalid duration formula, where the second invalid duration formula is:

$T_{blank2} = \Delta t - (1/V_f)$;

wherein $T_{blank2}$ represents the invalid output duration to which the first image frame corresponds, $\Delta t$ represents the transmission duration, $1/V_f$ represents the valid output duration, and $V_f$ represents the first transmission rate.

19. A display device, wherein the display device comprises the refresh rate adjustment circuit according to claim 10.

20. A computer readable non-transitory storage medium, wherein the computer readable non-transitory storage medium is stored with instructions for causing a computer to execute the refresh rate adjustment method according to claim 1 in response to the computer readable non-transitory storage medium being run on the computer.

\* \* \* \* \*